UNITED STATES PATENT OFFICE.

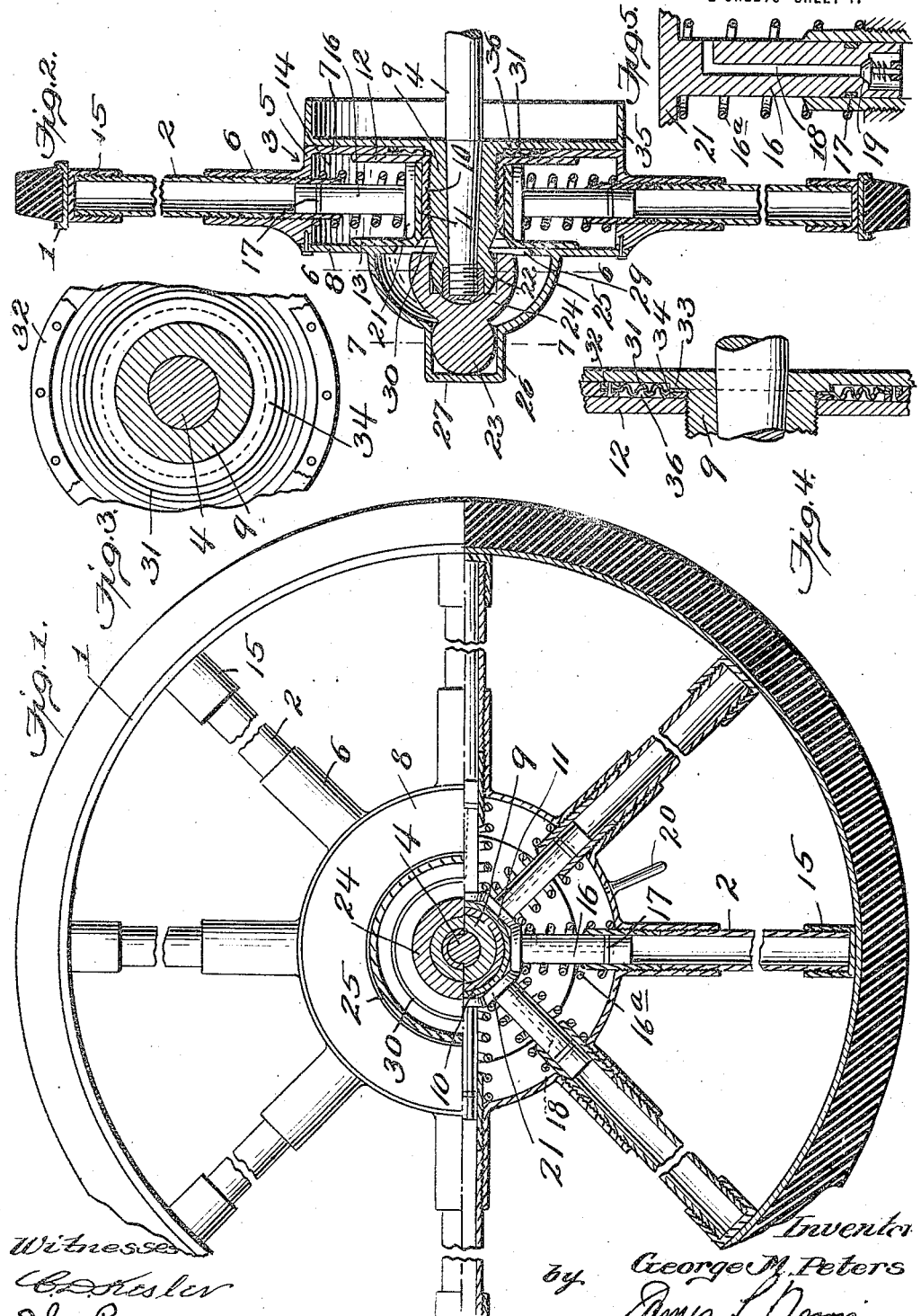

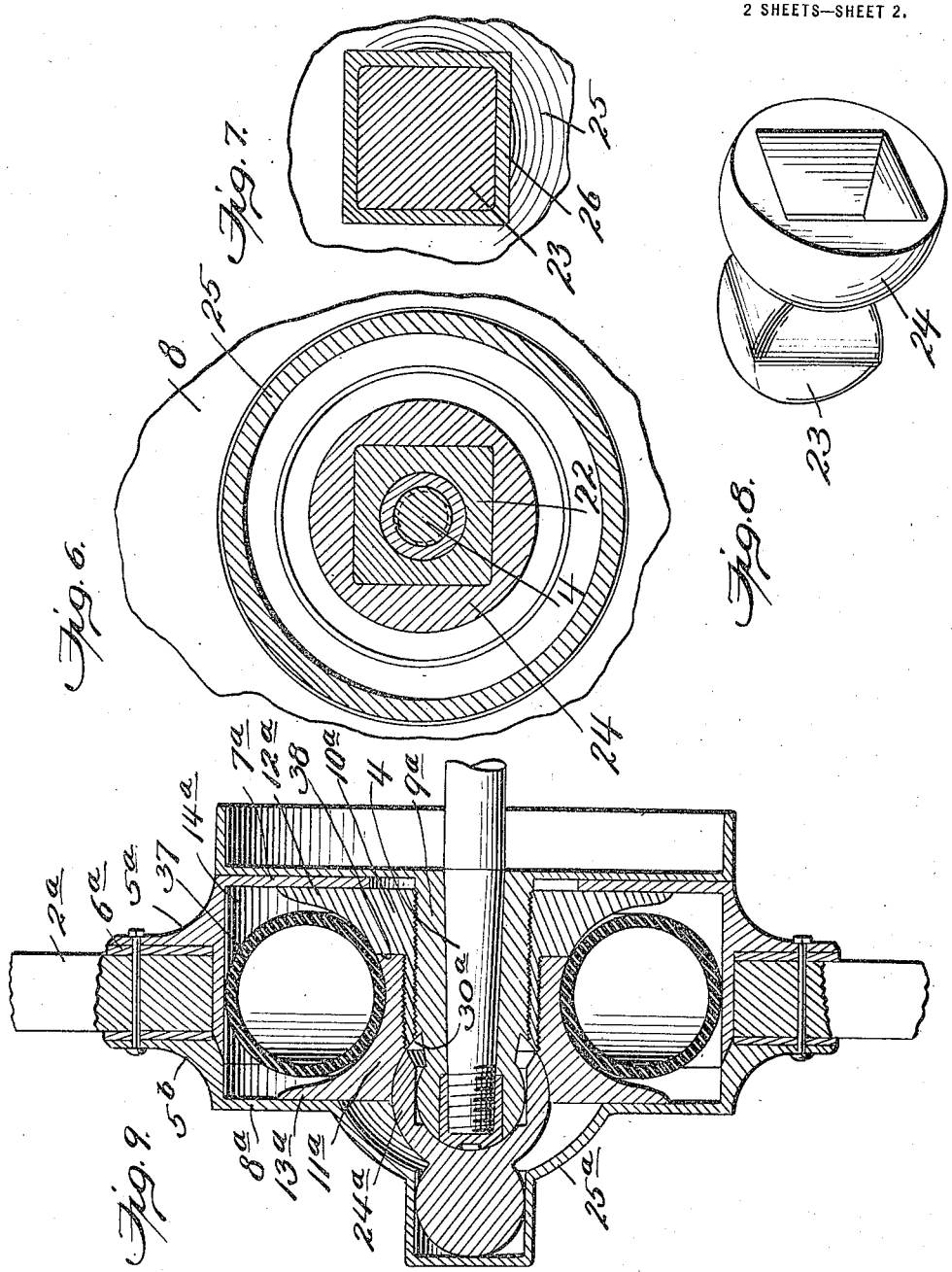

GEORGE M. PETERS, OF KIRKWOOD, MISSOURI.

CUSHION-WHEEL.

1,342,461.   Specification of Letters Patent.   Patented June 8, 1920.

Application filed March 30, 1917. Serial No. 158,728.

*To all whom it may concern:*

Be it known that I, GEORGE M. PETERS, a citizen of the United States, residing at Kirkwood, in the county of St. Louis and State of Missouri, have invented new and useful Improvements in Cushion-Wheels, of which the following is a specification.

This invention relates to improvements in cushion wheels for vehicles, proposing a construction wherein cushioning media are operatively interposed between the felly and the axle and wherein the wheel is specially adapted for motor vehicles by the provision of universal driving connections between the axle and the wheel proper.

The objects of the invention, briefly stated, are to provide a wheel of the type identified wherein the universal driving connections are compactly organized yet have great strength to resist the torque to which they are subjected; and wherein the wheel hub, of which the said universal connections form a part, is adaptable to various constructions and arrangements of cushioning media and is readily accessible for the purposes of renewal, lubrication, or repair.

Embodiments of the invention are illustrated in the accompanying drawings, wherein:—

Figure 1 is a view partly in side elevation and partly in central section of a wheel in which the features of the invention are incorporated;

Fig. 2 is a cross-sectional view thereof;

Fig. 3 is a detail elevation, and Fig. 4 is a detail sectional view showing a flexible sealing ring employed in the construction shown in Figs. 1 and 2;

Fig. 5 is a detail sectional view showing an air valve with which each spoke of the wheel is provided;

Figs. 6 and 7 are detail sectional views on the lines 6—6 and 7—7 of Fig. 1;

Fig. 8 is a detail perspective view of an element of a universal joint driving connection between the axle and the wheel.

Fig. 9 is a cross sectional view showing a modified construction.

Similar characters of reference designate corresponding parts throughout the several views.

Referring to Figs. 1 to 8:

The wheel includes a felly 1, spokes 2 and a hub 3 mounted on an axle 4 whose spindle projects into said hub.

The hub 3 includes elements which are stationary with respect to the wheel proper and other relatively movable elements which are stationary with respect to the axle 4. As shown, the hub includes an outer ring 5 formed with radially projecting sockets 6 in which the spokes 2 are secured and side plates 7 and 8 carried by and projecting inward from the ring 5, the plate 8 being detachable from said ring, these being the elements which are stationary with respect to the wheel proper. Within the hub, the axle has fast thereon a sleeve 9; and the hub is completed by an inner ring 10 which is preferably threaded on the sleeve 9 and by an intermediate ring 11 which surrounds and has a close fit on the ring 10, the rings 10 and 11 being formed, respectively, with outwardly projecting side plates 12 and 13 which have a close fit against the inner faces of the side plates 7 and 8.

In the assemblage of the wheel, the sleeve 9 is fitted on the axle which is then inserted into the hub and the rings 10 and 11 are thereafter successively fitted in position, the ring 10 being threaded upon the sleeve 9 until its inward movement is limited by the engagement of the side plate 12 with the side plate 7 and the ring 11 being fitted upon the ring 10 and moved inwardly until its inward movement is limited by its engagement with the side plate 12. After the parts of the universal joint connecting means, to be hereafter described, between the axle and the wheel have been fitted, the side plate 8 is secured against the ring 5, as shown in Fig. 2, to confine the ring 11 in position and to close the internal chamber 14 of which the ring 5, ring 11, and side plates 7, 8, 12 and 13 form walls.

The spokes 2 are of hollow construction and are closed at their outer ends by the sockets 15 in which they are fitted. Plungers 16 disposed within the chamber 14 project into the spokes 2 at the inner ends thereof and within said spokes are provided with packing rings 17. It is preferred, in order to cushion the floating action of the axle relatively to the wheel, that the spokes 2 and chamber 14 shall be charged with air compressed to a suitable degree, whereby when any of the plungers 16 moves outward, such movement will be opposed by the air cushion within its companion spoke. The plungers 16 are each formed with ducts 18 extending between their inner and outer ends and at their outer ends are provided with valves 19 which will be normally held closed by the air pressure within the spokes 2. It will be apparent that if air through a suitable valve-controlled nipple 20 is forced under pressure into the chamber 14, a part of the air will move through the ducts 18 and past the valve 19 into the spokes 2, thereby providing for the effects stated.

In order to assist the cushioning action of the air within the spokes 2, and, independently thereof, if desired, it is preferred to provide within the chamber 14 helical compression springs 16$^a$ which surround the plungers 16 and bear at their outer ends against the ring 5 and at their inner ends against heads 21 provided on the inner ends of said plungers, said heads bearing against the ring 11, as shown in Figs. 1 and 2.

The invention proposes, in addition to the features above described, a novel form of universal joint driving connection between the axle and the wheel. The said driving connection comprises an inner ball member 22 rigid with the axle and preferably formed at one end of the sleeve 9, an outer ball member 23 associated with the hub 3, and an externally spherical connection member 24 between the members 22 and 23, the member 24 being formed with or secured to the member 23 and having a socket for the member 22. The plate 8 is formed with a laterally extended housing 25 which includes a socket 26 for the ball member 23 and an end wall or closure 27 for said socket. The ball members 22 and 23 and the respective sockets therefor are formed to coact in transmitting rotation from the axle to the wheel. For this purpose and as preferred said sockets, i. e. the socket of the connecting member 24 and the socket 26 are square and said ball members are of square section in any plane at right angles to the axis and of generally circular cross-section in any transverse plane, as clearly shown in Figs. 6, 7 and 8. Obviously, the socket of the member 24 will permit a relative sliding movement of the member 22 in connection with the increase or decrease of the distances between the centers of the members 22 and 23 incident to the floating action of the axle relatively to the wheel.

The universal joint driving connection described possesses great strength, operates with all requisite freedom, and is compactly organized and accessibly arranged at one side of the wheel. To provide for the requisite turning movements of the member 24 about the member 22, and, at the same time, to promote the compactness of organization, the side plate 8 is formed with a central opening 29 through which the member 24 may operate; and for a similar purpose, the rings 10 and 11 are conjointly formed to provide a flaring recess 30.

It will, of course, be understood that any suitable provision may be made to prevent leakage of air from the chamber 14. Thus, one or more packing gaskets may be interposed between the side plate 8 and the ring 5 throughout the annular area within which said side plate is secured by bolts or otherwise to said ring. At the opposite side of the wheel, a flexible packing ring 31 (Fig. 4) may be provided, the said ring having a marginal lap fit against the side wall 7 to which it is held by a retaining band 32 and against an annular shoulder 33 formed with the sleeve 9 to which it is held by a nut 34 mounted on said sleeve.

As a matter of convenience, and as preferred, the sleeve 9 carries at its inner end the brake drum 35, the imperforate side wall of which provides a dust-guard for the packing ring 31, and, in conjunction with the adjacent side plate 12, defines a chamber 36 in which the annular scorings or corrugations of the ring 31 may have free play in connection with the floating movements of the axle.

Fig. 9 shows a modification wherein the wheel hub and the universal joint driving means which connect the axle and the wheel are, in general, of the construction already described, but in lieu of the hollow spokes and the air and spring cushions employed in the first embodiment, an annular pneumatic cushion tube 37 of suitable elastic construction is used, the same being mounted in a chamber 14$^a$ corresponding generally to the chamber 14 of the first embodiment. In the modified construction, the ring 5 is made in two parts 5$^a$ and 5$^b$, and the spokes 2$^a$ which are of solid construction are fitted in suitable sockets 6$^a$ whose mating or half-sections are carried by the ring parts 5$^a$ and 5$^b$. The parts 5$^a$ and 5$^b$ are provided with side plates 7$^a$ and 8$^a$ corresponding, generally, to the side plates 7 and 8 of the first embodiment and the side plate 8$^a$ is provided with a laterally extended housing 25$^a$ corresponding to the housing 25 of the first embodiment. The rings 10$^a$ and 11$^a$ correspond to the rings 10 and 11 of the first embodiment. In the modification, it is preferred that the ring 11$^a$ shall be threaded on the ring 10$^a$ and shall abut an annular shoulder 38 with which the ring 10$^a$ is provided. The rings 10$^a$ and 11$^a$ are formed with side plates 12$^a$ and 13$^a$ which correspond generally to the side plates 12 and 13 of the first embodiment, but which conjointly provide a grooved seat or a seat semi-circular in cross-section for the cushion tube 37, the said tube bearing at one side against the rings 10$^a$ and 11$^a$ and at its opposite side against the ring part 5$^a$. In the modified construction, the connecting member 24$^a$ of the universal joint and which corresponds to the member 24 of the first embodiment is directly socketed in a recess 30ª provided by suitably fashioning the adjacent faces of the rings 11ª and 10ª and of the sleeve 9ª.

I claim as my invention—

1. A cushion wheel having, in combination, a hub, an axle projecting into the hub, a sleeve mounted on the axle within the hub, the hub comprising an outer ring to which the spokes of the wheel are secured, side plates carried by and projecting inwardly from said ring, an inner ring directly mounted on said sleeve, an intermediate ring directly mounted on the inner ring, side plates carried by and projecting outward from the inner and intermediate rings and lying against the inner faces of the first named side plates, all of said rings and side plates providing a chamber for a cushioning medium, and universal joint connecting means between the axle and the hub having an element thereof provided on the end of said sleeve, the latter carrying at the side of the hub remote from said connecting means a plate which lies against the outer face of the adjacent side plate.

2. A cushion wheel having, in combination, a hub, an inclosed chamber for a cushioning medium arranged within said hub, an axle projecting through said hub and chamber, and universal joint driving means between the axle and the hub located at one side of said chamber and comprising an inner ball member provided on the end of the axle and rigid therewith, an outer ball member and a connecting member carried by and rigid with the outer ball member and having a socket for the inner ball member, the hub including a removable side plate having an end socket for the outer ball member, said ball members having a rectangular cross-section in any plane at right angles to the axis and a generally circular cross-section in any transverse plane and the said sockets for the respective ball members being square to permit the requisite play of said ball members and to transmit the rotation of the axle to the wheel, the inner ball member being slidable in the connecting member.

In testimony whereof I have hereunto set my hand in presence of two subscribing witnesses.

GEORGE M. PETERS.

Witnesses:
ROBERT H. DOHR,
JNO. J. ROWE.